Figure 1:
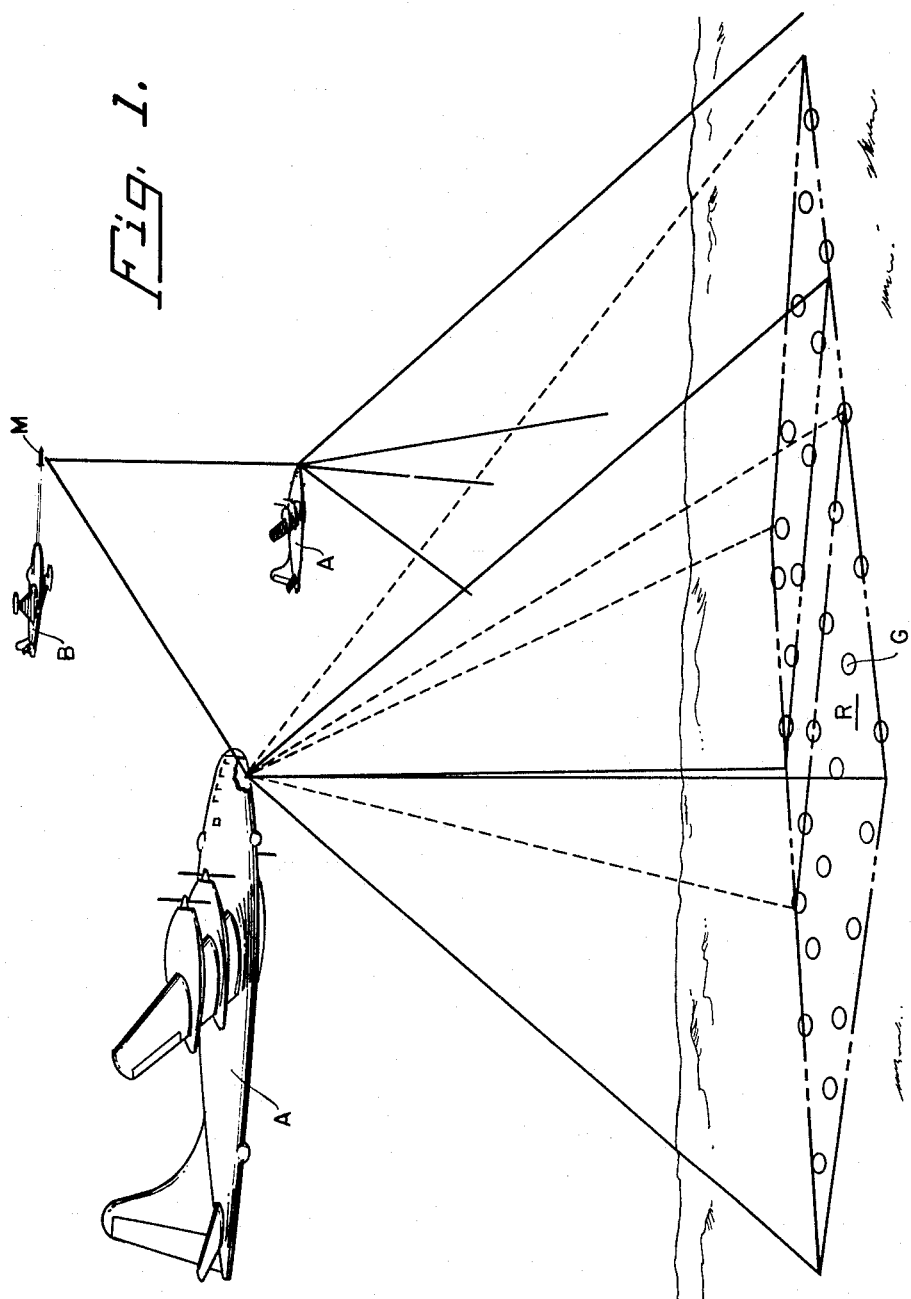

Nov. 29, 1960

F. A. KINDER ET AL 2,961,933

AIRBORNE CINETHEODOLITE

Filed Jan. 23, 1956

2 Sheets-Sheet 1

INVENTORS.
FLOYD A. KINDER
ELMER E. GREEN
BY

ATTORNEYS

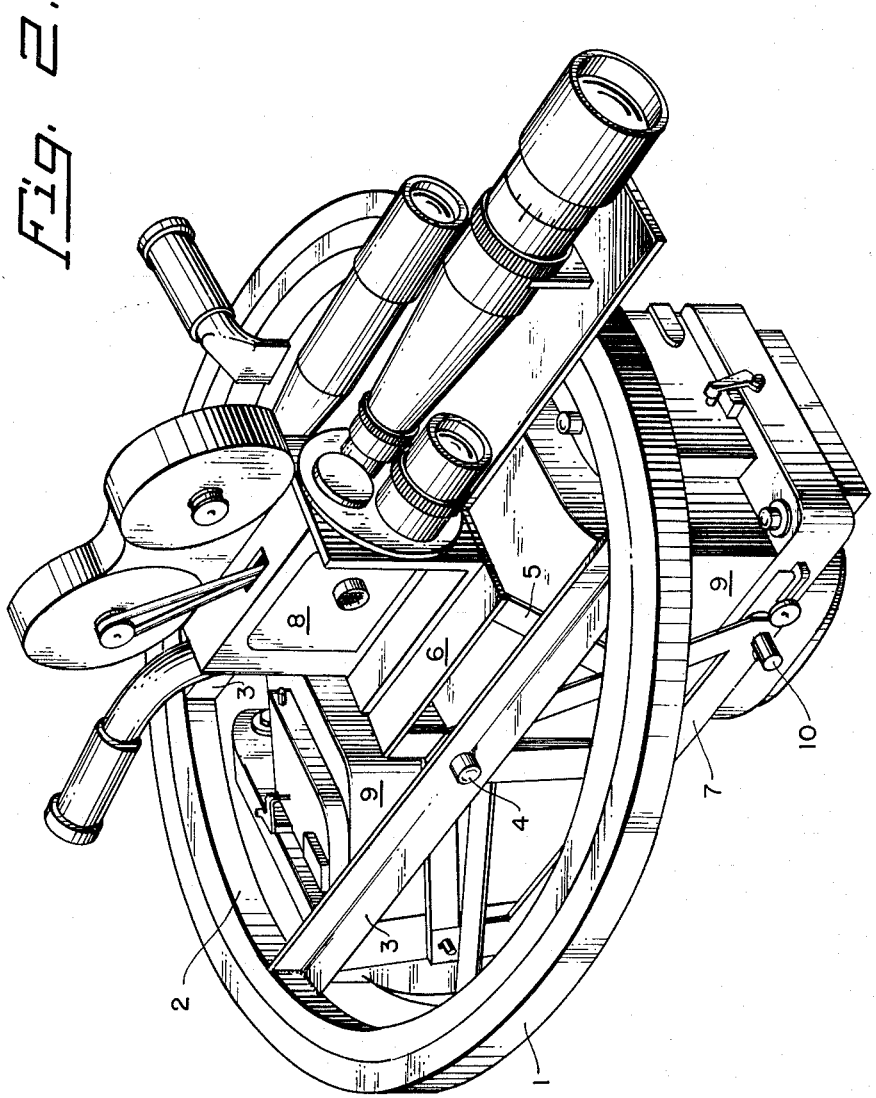

United States Patent Office 2,961,933
Patented Nov. 29, 1960

2,961,933

AIRBORNE CINETHEODOLITE

Floyd A. Kinder and Elmer E. Green, China Lake, Calif., assignors to the United States of America as represented by the Secretary of the Navy Filed Jan. 23, 1956, Ser. No. 560,908

3 Claims. (Cl. 95—12.5)

(Granted under Title 35, U.S. Code (1952), sec. 266)

The invention described herein may be manufactured and used by or for the Government of the United States of America for governmental purposes without the payment of any royalties thereon or therefor.

This invention relates to means for photographing missiles in flight and more particularly to airborne cinetheodolites for determining the absolute position and attitude of missiles in flight at high altitude, and to methods involved in the use of such cinetheodolites for tracking high altitude missiles for analysis and test purposes.

It has long been the practice to make photographic studies of objects in flight to determine the absolute position and attitude thereof, for test purposes, as in the determination of the launching and flight characteristics of a missile, such as a rocket. In general, such studies have been effected by the use of ground mounted tracking cameras known as cinetheodolites, which in general recorded the photographic representation of the missile being tracked as well as the sighting angles, altitude, azimuth. It was common to take a series of moving pictures of the missile to be tracked concurrently from at least two fixed stations on the ground by means of cinetheodolite cameras positioned at each such station. Such a procedure had come into general use prior to the present invention and, in general, could be said to be satisfactory for use with low flying missiles. At high altitudes, however, the larger distance limited the usefulness of the prior art systems and apparatus as previously described, because at such altitudes the photographic and data reduction problem was greatly amplified by the fact that image sizes became almost infinitesimal and visual contrast was difficult of appraisal.

The present invention has solved the problem of high altitude photographic tracking for test purposes to make it possible to economically and efficiently procure photographic data on the flight characteristics of missiles at relatively high altitudes. The present invention is based upon the discovery that satisfactory accuracy could be attained in photographic study of missiles in flight at high altitude by the use of airborne cinetheodolites if such cinetheodolites included means to photographically track a missile and means to simultaneously photograph a recognizable ground range. Thus, simultaneous photographs taken of ground targets by so-called marker cameras and of a missile in flight by tracking cameras can be correlated and transferred to a ground coordinate system by rotation and translation of the axes, if the relative angularity of the marker camera and the tracking camera are known at the instant the photographs are taken. The implementation of this discovery involves basically, in one type of application, a marker camera fixedly mounted relative to an aircraft frame at a given angle thereto to photograph ground markers as the aircraft traverses over such markers, and a cinetheodolite camera mounted relative to said frame at a known angularity thereto, variations therefrom being measurable in the operation of the cinetheodolite camera. This discovery has resulted in the development of methods and various types of apparatus for the practical aerial study of missiles in flight at high altitudes, the following disclosure more specifically describing such methods and apparatus.

It is therefore an object of this invention to provide methods and apparatus whereby missile trajectory and attitude data may be obtained without the use of ground cameras.

It is a further object of this invention to provide methods and apparatus for efficient, economical and practical high altitude missile photography for test purposes.

It is a still further object of this invention to provide methods and apparatus whereby cinetheodolite photographic study of missiles in flight may be made from flying camera stations, in such a manner as to provide accurate data for studying the flight characteristics and behavior of such missiles.

Still another object of this invention is to provide an airborne apparatus including in a unitary structure a tracking camera and one or more marker cameras in fixed relationship to one another whereby when utilized in flight said combination of cameras may produce simultaneous photographs of a ground marker system and of a missile in flight for the purpose of providing accurate data for missile performance evaluation.

Other objects and many of the attendant advantages of this invention will be readily appreciated as the same becomes better understood by reference to the following detailed description when considered in connection with the accompanying drawings wherein:

Fig. 1 is a somewhat schematic perspective view of photographic aircraft and of a missile launching aircraft in flight over a marker range, illustrating a method according to this invention; and Fig. 2 is a perspective view of an airborne cinetheodolite particularly adapted to performance of the method illustrated in Fig. 1.

Referring now to the drawings, Fig. 1 depicts the novel method of this invention in operation. In its broadest aspect, this invention involves simultaneous recording of the distance and angular position of a photographic station relative to the earth and of the changing position of an object in flight relative to said photographic station. Photographic recording of such information can be interpolated to give exact information as to the line of flight and flight characteristics of an object in flight. In Fig. 1, for example, the method is shown as carried out by a team of two photographic aircraft designated by the letters A flying side by side (exact alignment is obviously not essential) and a substantial distance apart in the direction of and on opposite sides of the projected flight path of a missile launching aircraft B. In one possible arrangement, the aircraft A are each provided with a marker camera supported in the aircraft in a position to photograph the ground range R and the markers G thereon, and with a cinetheodolite camera to photographically track a missile M fired by the rocket launching aircraft B. The photographic record thus obtained may be utilized to give exact flight characteristics of the missile M since the angularity of the aerial photographic platform formed by each aircraft is determinable by the particular portion of the ground marker range R photographed thereby, and the angularity of the missile M to this platform is determined by the angular position recorded for the cinetheodolite camera for the particular photographic frame being studied. The relative distances involved are obtainable by the relative size of the missile in the cinetheodolite photograph and by the distance between markers in the simultaneous ground marker photograph. The use of two flying photographic platforms A, as shown, provides a pair of such photographic records taken on opposite sides of a flight path so that if the missile does not fly true the photographic record may be interpreted to show the deviation of flight from the projected path and to provide a basis for correlation of the test data procured from the photographic records to take this factor into account. It is preferable, in the interest of simplicity, that the ground marker camera be so related to the tracking camera that the angular relationship of the two cameras to one another is always directly determinable, it being also necessary or preferable that under this latter condition the ground marker camera be always capable of photographing a portion of the ground marker reference range. Ideally, the ground marker photographing arrangement may be attached to an aerial tracking camera in a fixed angular relationship thereto, making it possible to eliminate the conventional theodolite scales to determine the tracking camera's azimuth and elevation angles. Thus, if sufficient marker camera coverage is possible the azimuth and elevation angles of the tracking camera can be determined by survey of the ground markers photographed by the marker cameras, when the marker cameras are in a fixed relationship with the tracking cameras. A construction particularly adapted for such simplified performance of the stated functions is illustrated in Fig. 2 of the drawings, to be hereinafter described.

Fig. 2 illustrates an airborne cinetheodolite specifically adapted for use in the method described in the preceding paragraph and in which, by virtue of the nature of the method, it is possible to obviate the necessity for the usual cinetheodolite scales. The novel airborne cinetheodolite comprises a rigid support member 1 having an annular configuration as shown and adapted to be fixedly mounted in an aircraft. A mounting ring 2 is positioned within the support member 1 and supported thereby for rotation relative thereto. The specific manner of mounting the member 2 within the member 1 for support thereby and for relative rotation relative thereto is obviously not a critical factor, it being obvious that many known and conventional slide and bearing arrangements could be utilized to this end. Accordingly, no specific showing is given of the details of this mounting. The mounting ring 2 is provided with a pair of spaced parallel bars 3 which chordally span the mounting ring as shown, each said bar being provided with a bearing 4 adapted to rotatably support a pivot pin therein. A camera carrying frame 5 which has pivot pins positioned in the bearings 4 comprises a pair of side framing members 7 of generally triangular outer configuration and including said pivot pins, and a platform 6 constituting the top of the frame and connecting the opposed side members 7 to one another in a rigid construction. An aerial tracking type camera 8 is fixedly positioned upon the platform 6 as shown. A pair of ground marker cameras 9 are attached between opposed ends of the frames 7 by means of set screws or equivalent means and in such an angular relationship that they have overlapping fields of view so that at least one would photograph the surveyed ground marker as the tracking camera is tilted in elevation.

The specific nature of the cameras 8 and 9 is not of the essence of this invention. Many known types of cameras being obviously fitted for such use, it being necessary only that the cameras be mounted in a fixed relationship as described and caused to operate in such a manner that their several photographic records may be interpreted as a timed entity. This may be accomplished by various known means, the simplest being electrical operation of the various cameras from a single switch means.

In operation, in the practice of the method of this invention, airborne cinetheodolites of the type hereinbefore described are mounted in appropriate wing or belly pods of the photographic aircraft, as for example in the forward belly pod thereof, as shown in Fig. 1. The aircraft are flown over the identifying ground marker range, as previously described, on opposite sides of the proposed track of missile travel. If a missile is released along said track and tracked by the camera 8 of the cinetheodolite with cameras 8 and 9 in operation, simultaneous photographic records of the relative distance and orientation of the flying station from the missile and from the ground are formed. Such data may easily be interpolated to give accurate and complete test data relating to the flight characteristics of the missile.

From the above it will be evident that the instant invention provides for the first time a method for photographic study of flight characteristics from flying camera stations. Moreover, this invention provides an airborne cinetheodolite particularly arranged and adapted for use in the practice of said method, and makes possible, for the first time, accurate economical and simple test data procurement and evaluation insofar as high altitude missile flight characteristics study is concerned.

Obviously, many modifications and variations of the present invention are possible in the light of the above teachings. It is therefore to be understood that the scope of the invention is not to be limited by the specific illustrative examples given but rather by the scope and limitations of the appended claims.

What is claimed is:

1. An airborne cinetheodolite comprising a rigid support member adapted to be mounted in an aircraft, said support member having an annular configuration, a mounting ring supported on said support member and adapted to be rotated therein with said member serving as a track for such motion, a pair of spaced parallel crossbars chordally spanning said mounting ring and provided with centrally located pivot pin bearings, a camera carrying frame having pivot pins positioned in said bearings whereby said frame may be moved in rotation about said support and in elevation about said pivot pins, said carrying frame comprising a platform positioned above the plane of said support member, and a pair of depending side members, a first camera fixed to said support member for photographing objects above and below the plane of the support member, second and third cameras attached between opposed ends of said depending side members in such an angular relationship with each other that they have overlapping fields of view and at such a fixed angle to said first camera so that at least one of said second and third cameras will photograph objects below said supporting ring when said first camera is tilted in elevation, whereby views of a projectile and of reference markers on the ground may be simultaneously photographed for test purposes.

2. A method for determining the course and attitude of a missile in flight from a pair of airborne camera stations, said method comprising the steps of flying each of said pair of airborne camera stations to opposite sides of the projected flight path of a missile, photographically tracking the missile from each said station with a tracking camera and simultaneously photographing the ground from each station with a ground camera which is in a determinable angular relationship with the tracking camera, each said station being flown over a pattern of orientation markers on the ground so that the photographs taken by said ground camera may be easily assessed analytically to give the distance and attitude of said camera station relative to the ground, said camera stations each forming simultaneous photographic records showing the relationship of the camera station to the missile and to the ground so that the course and attitude of the missile are determined therefrom, and said pair of stations providing one set of said photographic records from each side of said flight path for accurately determining lateral deviations of said flight path.

3. A method for determining the course and attitude of missiles in flight, comprising the steps of mounting a plurality of photographic means in each of two aircraft, mounting said plurality of photographic means in each aircraft in a continuously determinable angular relationship to one another such that one of said plurality of photographic means is directed to track a target while the remaining of said plurality of photographic means is directed at the ground, providing a pattern of orientation markers on the ground, flying said pair of aircraft each at opposite sides of the projected flight path of the missile over the orientation marker pattern in a position to view the path of the missile, photographically tracking the missile in flight from each aircraft in a path to one side of each aircraft with said one of a plurality of photographic means while simultaneously photographing the ground with said other of said plurality of photographic means, whereby because of the angular relationship of each said plurality of photographic means the trajectory and attitude of the missile may be accurately plotted, and because of the use of photographic means in two aircraft lateral deviations in the flight path of the missile may also be accurately determined.

References Cited in the file of this patent

UNITED STATES PATENTS

| | | |
|---|---|---|
| 2,104,976 | Eliel | Jan. 11, 1938 |
| 2,570,653 | Dillard | Oct. 9, 1951 |
| 2,647,320 | Keuffel | Aug. 4, 1953 |
| 2,671,388 | Brubaker | Mar. 9, 1954 |
| 2,685,238 | Baker | Aug. 3, 1954 |

OTHER REFERENCES

Ser. No. 256,012, Santoni (A.P.C.), published May 4, 1943.